Dec. 5, 1944.  F. W. FRINK  2,364,285
REMOTE CONTROL SYSTEM FOR STATION SELECTION
Filed Jan. 23, 1941  5 Sheets-Sheet 1
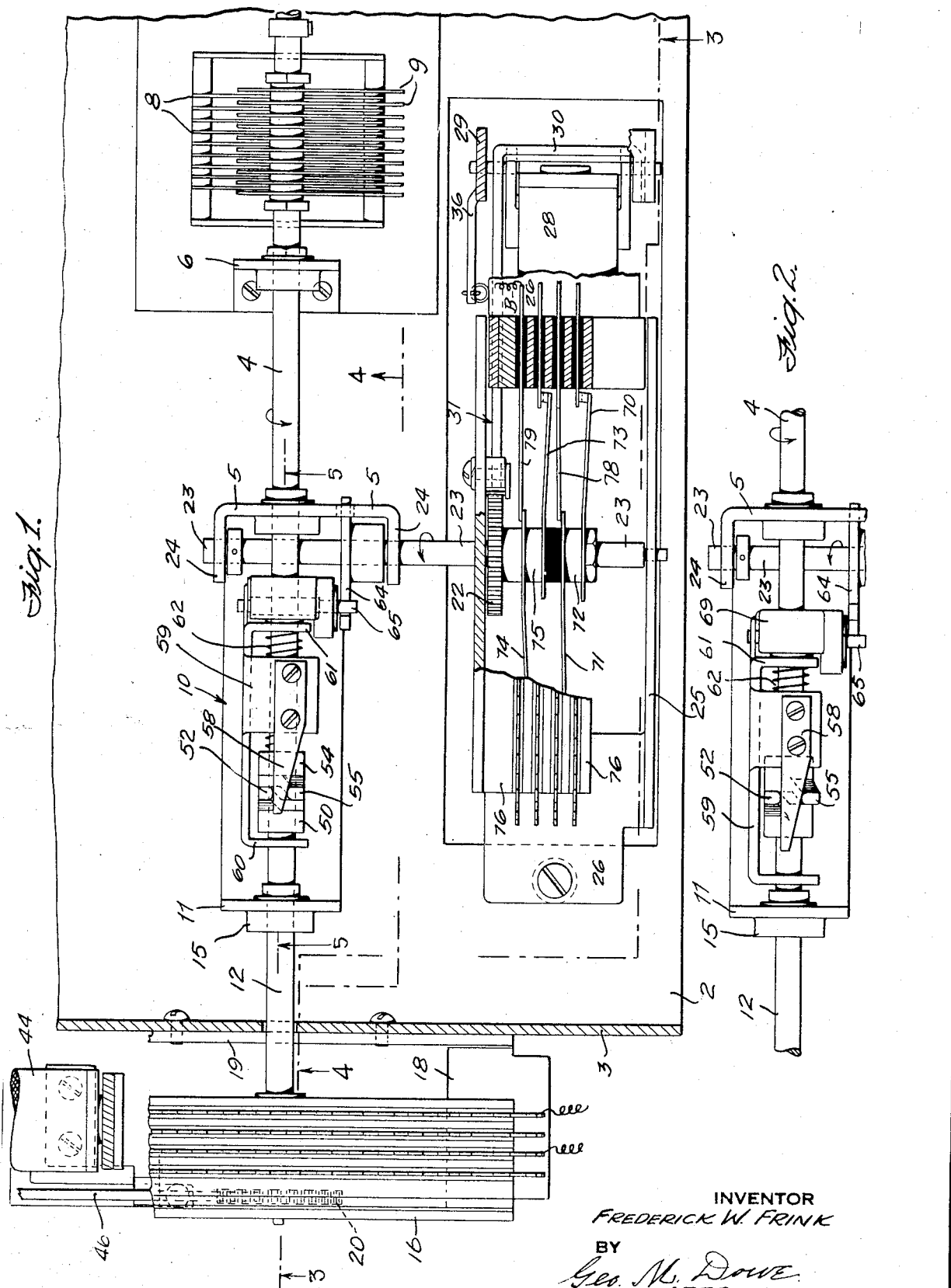
INVENTOR
FREDERICK W. FRINK
BY
Geo. M. Dowe
ATTORNEY

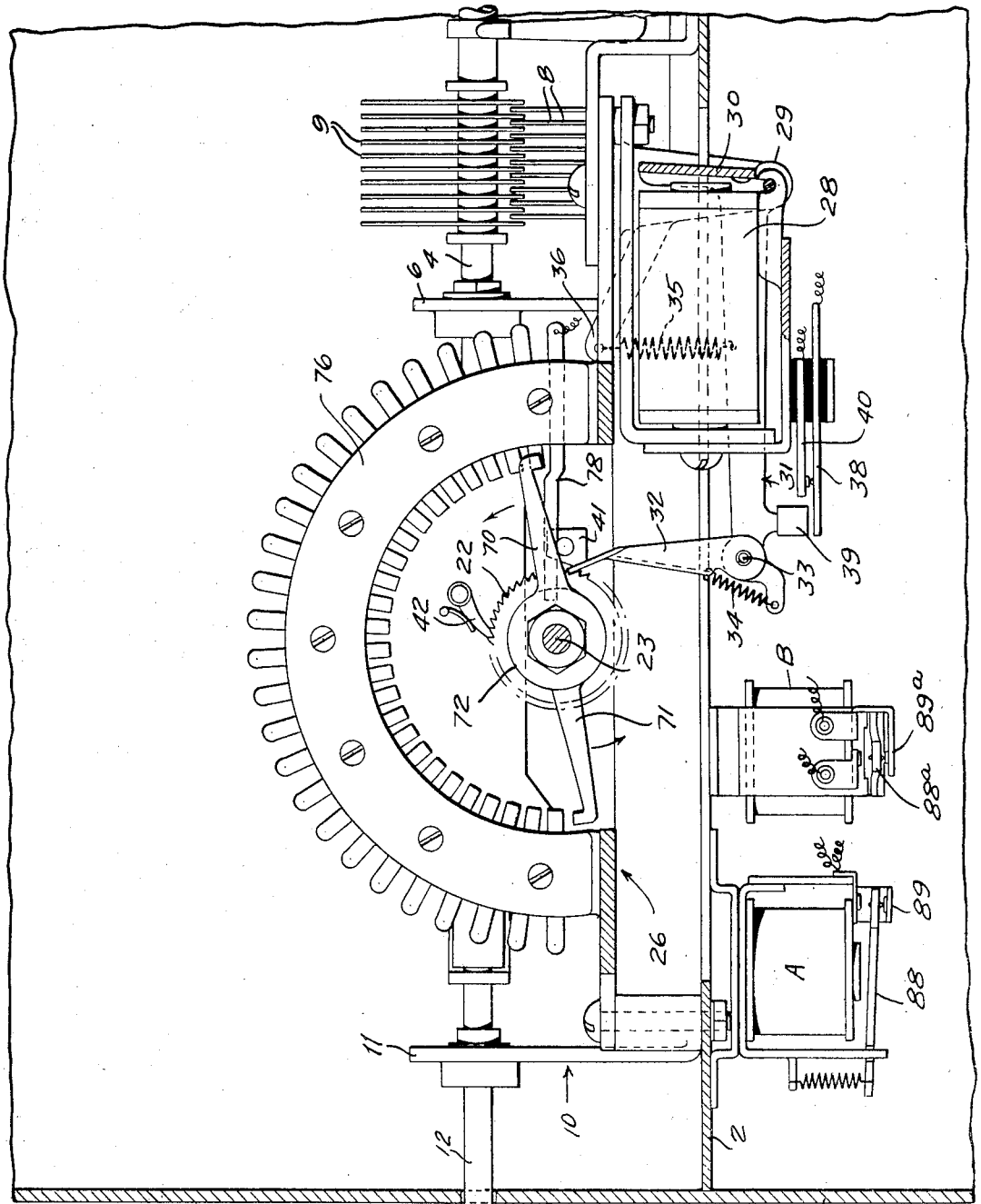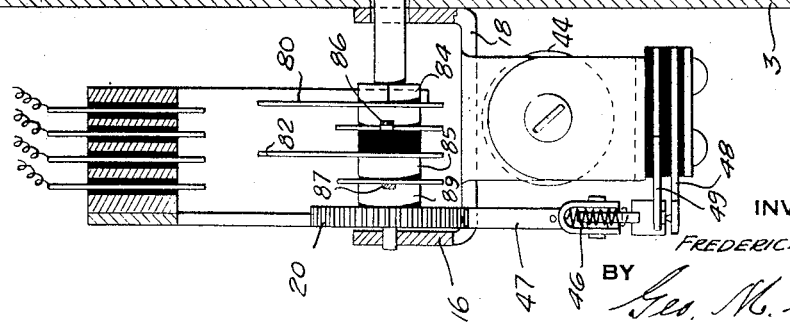

Dec. 5, 1944.　　　　F. W. FRINK　　　2,364,285
REMOTE CONTROL SYSTEM FOR STATION SELECTION
Filed Jan. 23, 1941　　　5 Sheets-Sheet 3
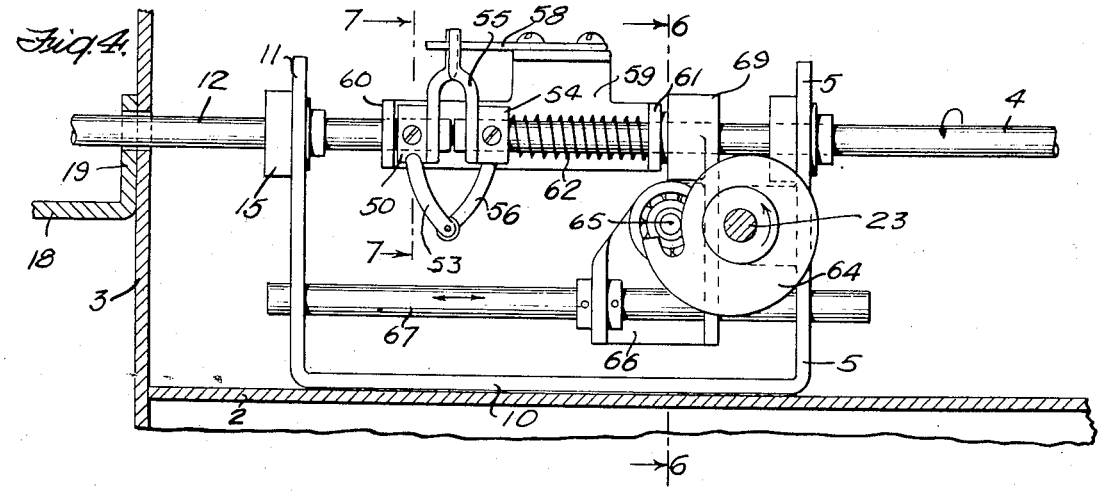
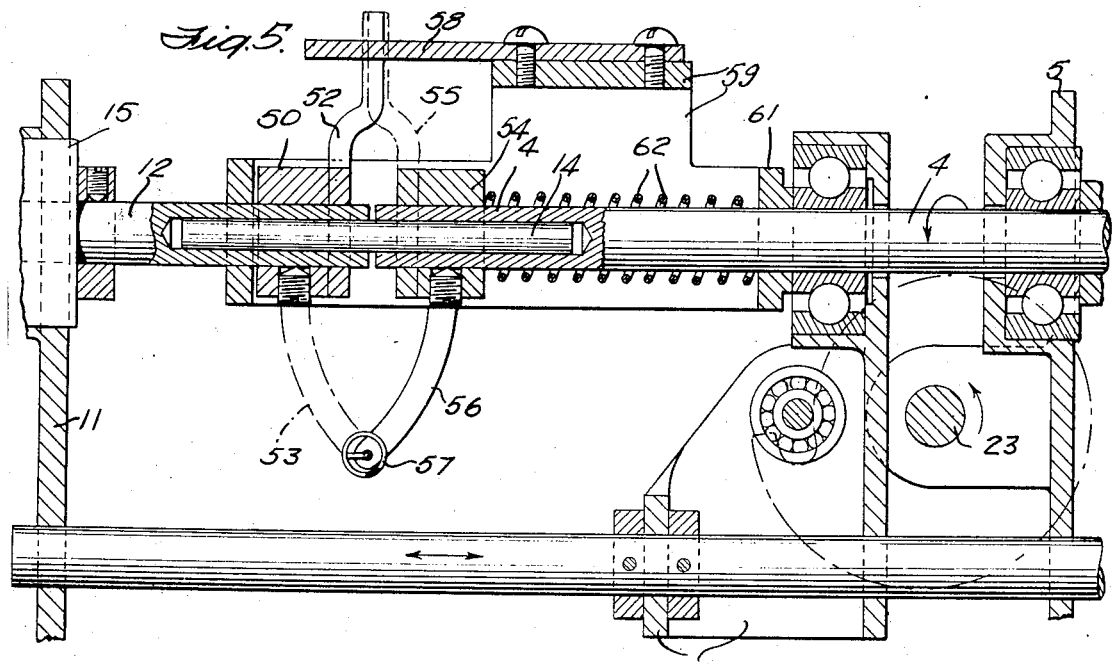
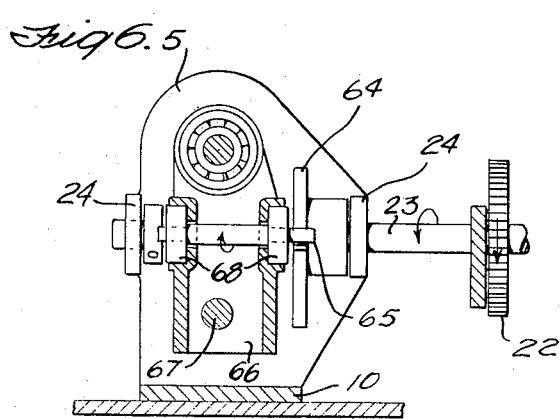
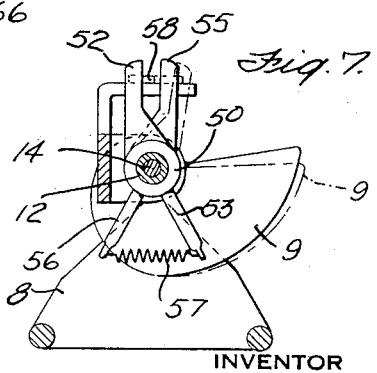
INVENTOR
FREDERICK W. FRINK
BY
Geo. M. Drue.
ATTORNEY Dec. 5, 1944.    F. W. FRINK    2,364,285
REMOTE CONTROL SYSTEM FOR STATION SELECTION
Filed Jan. 23, 1941    5 Sheets-Sheet 4
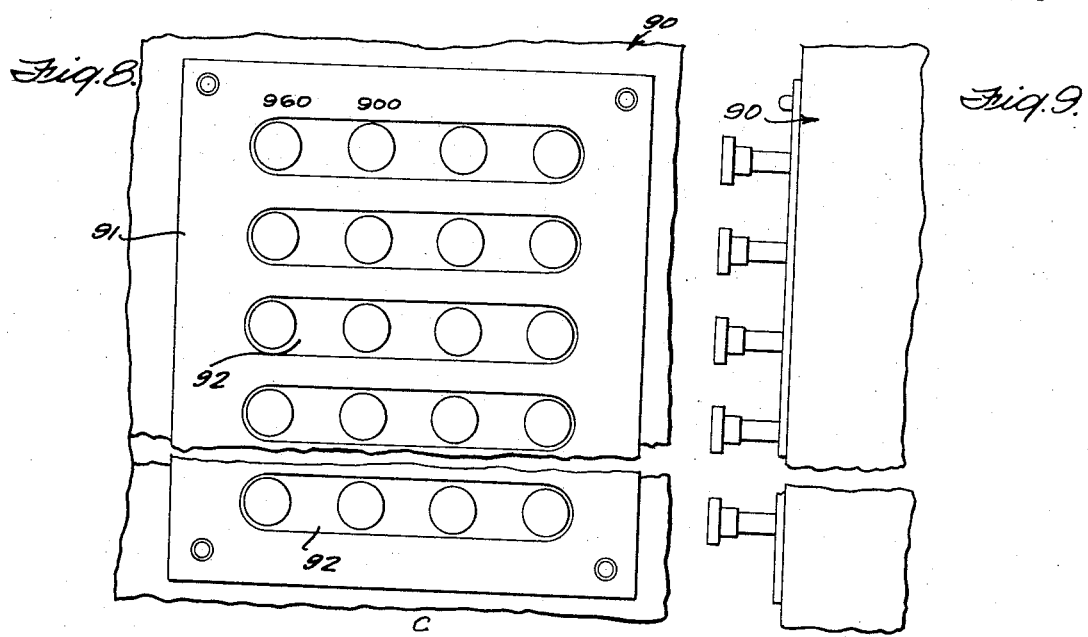
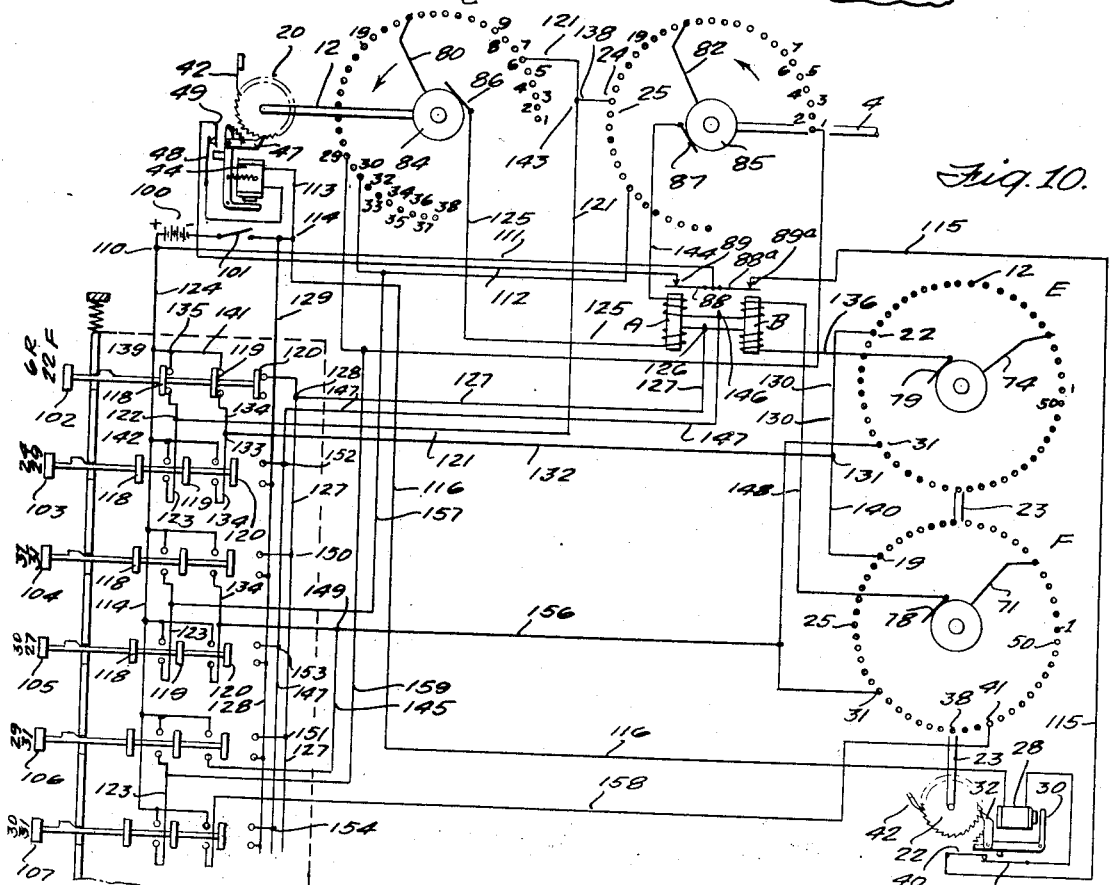
INVENTOR
FREDERICK W. FRINK
BY
Geo. M. Dowe
ATTORNEY Dec. 5, 1944.  F. W. FRINK  2,364,285
REMOTE CONTROL SYSTEM FOR STATION SELECTION
Filed Jan. 23, 1941  5 Sheets-Sheet 5

INVENTOR
FREDERICK W FRINK
BY
Geo. M. Dowe
ATTORNEY

Patented Dec. 5, 1944

2,364,285

UNITED STATES PATENT OFFICE 2,364,285

REMOTE CONTROL SYSTEM FOR STATION SELECTION

Frederick W. Frink, New York, N. Y.

Application January 23, 1941, Serial No. 375,677

20 Claims. (Cl. 172—239)

This invention relates to systems for tuning radio apparatus by remote control, particularly the radio receiving apparatus installed on aircraft. Since on aircraft it usually is not practicable to locate much of the radio apparatus within easy reach of the pilot, some method of tuning by remote control is necessary.

Where it is necessary to tune to a large number of different frequencies the methods of remote control in use at present, in so far as I am aware, either require too much time and effort in their operation, or are too complicated, bulky, and expensive.

The type of remote control sometimes used for broadcast reception, while practical when only six or eight control keys are used, is not practical for aircraft use where as many as thirty or forty, or even more, push-buttons or keys are desired. In the usual system using keys, it is necessary to add mechanical and electrical parts for each additional key, thus making such a system too bulky, heavy, and complicated for aircraft service.

An object of the present invention is the provision of a key controlled tuning system in which an increase in the number of keys, for the purpose of tuning to a greater number of frequencies, does not require the addition of any parts to the tuning mechanism, but merely requires the addition of one conductor for each added key.

Another object of the invention is the provision of means whereby a single set of keys may control the selection of two entirely different sets of radio frequencies.

A further object is the provision of electronic means controlled by the keys whereby very precise tuning may be had where required.

In the accomplishment of these and other objects, the invention employs two independent operating means for rotating the tuning shaft step by step, one of said operating means being used for coarse adjustment of the tuning, and the other operating means being used for fine adjustment, and means for integrating the step-by-step movements. Each of said operating means moves through a like cycle, and said means are coupled to the tuning shaft in such a way that one cycle of movement of one of said operating means rotates said shaft through an angle which is but one step of the rotation imparted to it by the other operating means.

Another feature of the invention relates to a method of connecting the keys to the tuning mechanism in such a way that some of the conductors can be associated with more than one key, thus reducing the number of conductors required for connecting the keys to the tuning mechanism.

Further features and advantages of the invention will become apparent from the following detailed description and claims when taken in connection with the accompanying drawings in which:

Fig. 1 is a plan view;

Fig. 2 is a portion of the upper central part of Fig. 1 showing some of the mechanism in a different position;

Fig. 3 is a section on the line 3—3 of Fig. 1 with parts in elevation.

Fig. 4 is a section on line 4—4 of Fig. 1 with parts in elevation.

Fig. 5 is a section on line 5—5 of Fig. 1 on an enlarged scale.

Fig. 6 is a detail taken along the line 6—6 on Fig. 4.

Fig. 7 is a detail taken along the line 7—7 of Fig. 4.

Fig. 8 is a plan of the keyboard constituting a remote control unit.

Fig. 9 is an elevation of the keyboard.

Fig. 10 is a wiring diagram with some features of the invention omitted for the sake of clearness.

Figure 11:
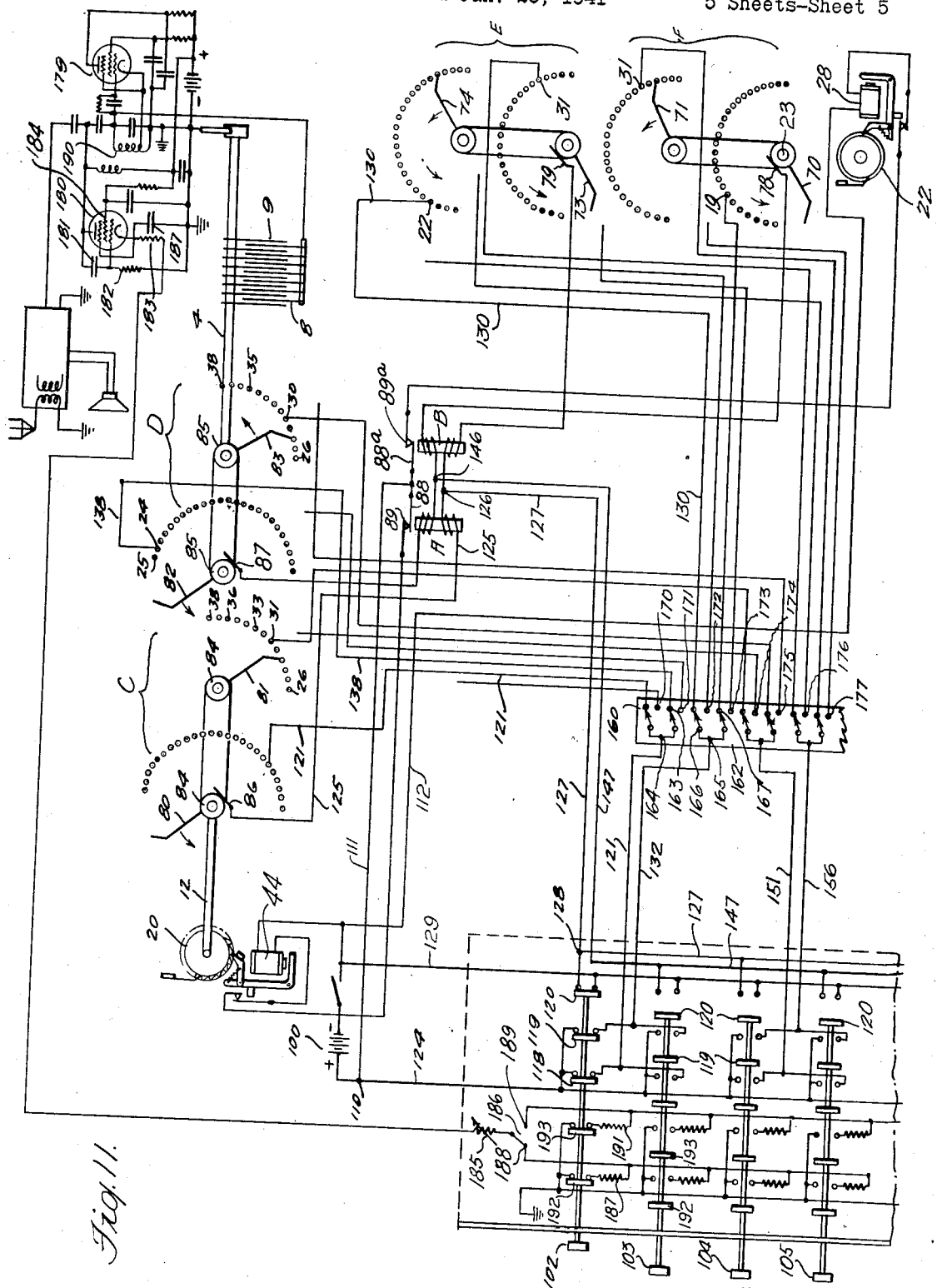
Fig. 11 is also a wiring diagram including the switching mechanism and the electronic means for more precise tuning under certain conditions.

Referring to Figure 1 of the drawings, 2 indicates a base member and 3 an end member of a supporting structure. A tuning shaft 4 extends through brackets 5 and 6 and to the right of the bracket 6 carries the movable element of a reactance device, which in the embodiment of the invention here shown, consists of a condenser having fixed plates 8 and movable plates 9, the latter being attached to the tuning shaft 4. The shaft 4 may carry such other condensers as are usual but these are not shown as they form no part of the present invention.

The bracket 5, Figure 4, forms one arm of a U shaped member 10, the other arm 11, of which supports one end of an auxiliary shaft 12 in line with the shaft 4, said shafts being maintained in correct alignment by a pin 14, Figure 5. Shaft 12, is supported in a bearing 15 carried by arm 11 and its other end passes through end wall 3 and finds support in member 16 Figure 3, forming part of a frame 18, a portion 19, Figure 1 being secured to the end plate 3.

*Operating means for the tuning shaft*

The shaft 4 is adapted to be rotated step-bystep by two independent operating means in the form of ratchet mechanisms. One ratchet 20 is secured to shaft 12 and the other ratchet 22 is secured to shaft 23, Figs. 1 and 3, extending at right angles to shaft 12. Shaft 23 is supported at one end in ears 24, forming part of bracket 5 and at its other end in a member 25 which is similar to member 16 and forms part of a supporting frame indicated generally by the reference character 26, Fig. 3.

The actuating mechanisms for both ratchets are substantially the same in construction and operation. That associated with ratchet 22, being shown more clearly in the drawings will be described first.

An electromagnet 28 is supported in the frame 26, Fig. 3, and mounted adjacent thereto is a bell crank 29 one arm 30 of which constitutes the armature for the magnet, while the other arm 31, carries a pawl 32 pivoted to the arm at 33.

A spring 34 urges the pawl into engagement with the teeth of the ratchet 22. A relatively strong spring 35 is secured at one end to arm 31 of the bell crank 29 and at its other end to a fixed arm 36. The spring 35 constitutes the force for moving the ratchet step by step to thus rotate the shaft 23. When the magnet is energized arm 31 moves downwardly and the pawl 32 takes hold of the next ratchet tooth. Upon the magnet becoming deenergized, spring 35 restores arm 31 to normal position thereby rotating the ratchet step-by-step.

When direct current is supplied to magnet 28 pawl 32 is moved back and forth. This action is brought about through the medium of a leaf spring 38 acted upon by an insulated lug 39 carried by arm 31. The spring 38 forms part of an electric circuit passing through the magnet 28 while a fixed contact 40 is connected at appropriate times, to the source of direct current. Spring 38 and contact 40 are normally in contact with each other but this contact is broken by lug 39. Spring 35 then acts to move pawl 32 to actuate ratchet 22 and spring 38 reestablishes its contact with 40, again causing current to be supplied to magnet 28. Pawl 32 thus continues to vibrate as long as current is supplied to magnet 28. Means, to be later described in connection with the controlling circuits, breaks the current supplied to magnet 28, at certain times to make shaft 23 stop at the correct position for station selection.

To prevent overthrow of the ratchet the pawl 32 engages a lug 41 at the end of its stroke. Reverse rotation of the ratchet is prevented by a detent 42. Thus normally the ratchet is locked from rotation in either direction.

By the mechanism described the shaft 23 is moved step-by-step.

The shaft 12 is also moved step-by-step through actuation of ratchet 20 under control of magnet 44, Figs. 1 and 3. Magnet 44 has its armature forming one arm of a bell crank similar to bell crank 31. Its other arm 46, Fig. 1 carries a pawl 47, Fig. 3, similar to pawl 32. Leaf spring 48 operates in conjunction with contact 49 in the same manner as do the elements 38 and 40. Both magnets 28 and 44 are supplied with current from the same source and are connected in parallel, thus enabling each operating mechanism to be moved separately or together as occasion may require.

It will now be in order to describe how the two independent step-by-step movements of the ratchets are integrated to cause step-by-step movements of the tuning shaft 4.

The shaft 12 is provided with a collar 50 secured to it and integral with said collar are two arms 52 and 53, see Figs. 4, 5 and 7. The shaft 4 is provided with a similar collar 54 which has affixed to it an arm 55 and an arm 56. The two pairs of arms 52—53 and 55—56 constitute a scissors like structure as clearly indicated in Fig. 7. A spring 57 connects the two arms 53 and 56 and tends to cause the arms 52 and 55 to approach each other. A wedge 58 Fig. 1 is interposed between the two arms 52 and 55 and is carried by a yoke 59 having end members 60 and 61 which are apertured. The shaft 12 passes through the aperture in the member 60 and the shaft 4 passes through the aperture in member 61. The yoke 59 loosely engages the two shafts and has a limited sliding movement thereon. A compression spring 62 encircles the shaft 4 and is confined between the fixed collar 54 and the member 61 of the yoke thereby urging the yoke towards the right as shown in Fig. 4.

The wedge 58 acts as a coupling device between the shafts 12 and 4, such action taking place as follows.

Shaft 12 is rotated step by step by ratchet 20. Arm 52 fixed to 12 through collar 50 also moves step by step and bears against the straight side of the wedge as shown in Fig. 1. The wedge with its yoke 59 may not only slide along the shafts 12 and 4, but may revolve about the axes of said shafts. Under action of arm 52 therefore the wedge revolves step-by-step as the shaft 12 is rotated step-by-step and this movement of the wedge is transmitted to arm 55 secured to shaft 4, which will also partake of the step-by-step movement of rotation imparted to shaft 12. Thus shaft 4 will have the same degree of angular movement as ratchet 20 and this constitutes a coarse adjustment of the tuning shaft.

The tuning shaft 4 may also be rotated independently by the sliding movement of wedge 58 and yoke 59 and this is also a step-by-step movement under control of the ratchet 22.

The means for accomplishing this movement includes a cam 64, secured to the shaft 23 and therefore partaking of the step-by-step rotational movement of the ratchet 22. As the cam is rotated step-by-step in the direction of the arrow, Fig. 4, its cam surface engages a pin 65, supported in a carriage 66 Fig. 6. This carriage is provided with a guide rod 67 secured to it, said rod sliding through apertures in the arms 5 and 11 of the yoke member 10 as clearly shown in Figs. 4 and 5. The carriage 66 is supported to slide in brackets 5 and 11 so that its movement is suitably guided and controlled whereby it moves parallel to itself under action of a cam 64. The upper portion of the carriage 66 is provided with a collar 69 loosely engaging the shaft 4 and as the cam moves the carriage 66, the collar 69 engages member 61 of the yoke 59 to move the wedge 58 step-by-step to the left as shown in Fig. 4. When the high part of the cam is reached, the spring 62 returns the wedge and the carriage 66 to starting position.

The cam 64 is so designed that one rotation of the cam imparts to the carriage 66, and hence to the wedge 58, a relatively small movement of the wedge. In Fig. 1 the wedge 58 is shown with the yoke 59 in its extreme right hand position while Fig. 2 shows the yoke 59 in its extreme left hand position with the two arms 52 and 55 separated to their greatest extent. By comparing these views it will be seen that with the shaft 12 stationary the rotation of the shaft 4 under control of the wedge 58 is extremely small. Preferably a complete rotation of the cam 64 corresponding to a complete rotation of ratchet 22, will cause the shaft 4 to be rotated through an angle equal to but a single step of movement imparted to it by the ratchet 20. It is to be noted, of course, that a complete cycle of movement of ratchet 20 and of the ratchet 22 is the same. In the physical embodiment of the invention, it is contemplated that each of the ratchets shall be provided with fifty teeth. It will therefore be seen that one step of movement of ratchet 22 imparts to the shaft 4 only 1/50 of the movement imparted to it by the ratchet 20. Therefore, the shaft 4 can have twenty-five hundred different positions under control of the joint action of the two ratchets and therefore, it is possible to tune the receiver of the radio set so close to the desired frequency that any discrepancy is negligible.

For instance, with the twenty five hundred positions which the shaft 4 may occupy under control of the ratchet mechanisms evenly spaced around an arc of 360°, each position will be separated by an angle equal to .144 degree.

In tuning the receiver to any particular frequency the most unfavorable condition that can occur is that the correct position for precise tuning is midway between the two nearest positions which can be obtained by means of the ratchet mechanisms. In such a case the discrepancy in tuning will be 0.144/2, or 0.072 degree. In receivers which are typical as to selectivity and band coverage, this discrepancy is negligible. For example, suppose that the receiver is to be tuned by a straight line frequency condenser which covers a frequency range of 500–1500 kc. in an angle of 270°. The frequency change in 0.072° is $$\frac{1000}{270} \times .072 = 0.266 \text{ kc.}$$

which is not enough discrepancy to affect the amplitude or the quality of the received signals if the selectivity of the receiver is not unusually great.

*Stationary electric contacts through the medium of which the ratchet mechanisms are stopped*

Provision is made for stopping each ratchet mechanism at a definite position under control of push-buttons appropriated to different stations or different radio frequencies.

As shown in Figs. 1 and 3 the shaft 23 has secured to it four wipers. The wipers 70 and 71, Fig. 1 are connected together electrically through a hub member 72 and are 180° apart as shown in Fig. 3. Wipers 73 and 74 are also 180° apart and are electrically connected to each other through hub 75. The hubs 72 and 75 are, however, insulated from each other and from the shaft 23. Wipers 70 and 71 are adapted to cooperate with series of stationary electrical contacts which are arranged in arcuate form as shown in Fig. 3. These series of stationary contacts are divided into two groups arranged in a semi-circle for convenience in wiring and mechanical construction, although the result is the same electrically, as though a single wiper were used, one wiper for each series, with the fixed contacts arranged to form a circle.

Wipers 73 and 74 are also arranged to engage a series of fixed contacts likewise arranged in two groups. The contacts are shown in Fig. 3 and the contacts of the group with which the wiper 70 co-acts, are numbered for convenience from 1 to 25. As one wiper of a pair leaves one group of contacts, its associated wiper engages the first contact of the next group of the series with which the two wipers 70 and 71 are associated or with the series with which the wipers 75 and 74 are associated.

Each group of contacts is insulated from the other group. Likewise each contact is individually insulated from its adjacent contact and the groups are held together by arcuate plates 76 one of which is shown in Fig. 3 and both in Fig. 1.

A stationary take-off arm 78 makes sliding contact with the take-off ring with which the wiper 71 is connected. Likewise, the take-off arm 79 makes sliding contact with a ring to which the wiper 74 is connected. Take-off arms 78 and 79 for the two series of wipers are electrically connected to relay B shown in Fig. 3 and whose function and operation will be described in detail in connection with the wiring diagram.

The series of stationary electric contacts associated with shaft 12 are like those described as associated with shaft 23 but due to the relative position of the two shafts their associated contacts are better shown in connection with shaft 23.

Shaft 12 however, carries four wipers, two of which 80 and 82 are shown in Figure 3. Opposite to wiper 80 is a wiper 81 and opposite wiper 82 is a wiper 83, see also Fig. 11. Wipers 80 and 81 are connected with the same hub 84 and correspond to wipers 70 and 71, Figs. 1 and 3. Wipers 82 and 83 are connected to the same hub 85 and correspond to wipers 73 and 74.

The hubs 84 and 85 are insulated from one another and each carries a take off ring with which take off arms engage. Take off arm 86 engages a ring on hub 84 and take off arm 87 engages a ring on hub 85. The take off arms are electrically associated with relay A Fig. 3.

Each of the relays A and B are of like construction and each includes an electromagnet and a spring retracted armature 88, making or breaking a contact 89 as the coils of the magnets are energized and deenergized. The action of these magnets and their function will be understood in connection with the wiring diagrams shown in Figs. 10 and 11.

Before explaining these diagrams it will be in order briefly to refer to the remote control unit. This includes a keyboard 90, Figs. 8 and 9, the keys of which are blank. An index plate, card or sheet 91 is provided with slots 92 through which the keys project and this index medium is provided with appropriate designations indicating frequencies, stations or identifying indicia.

The index medium may have indicia on both sides whose use will be more clearly understood in connection with the discussion of the wiring diagrams.

*Operation of the ratchet mechanisms to effect selection*

The operation of the ratchet mechanisms to select different stations or radio frequencies is brought about by means of electric circuits controlled by keys of keyboard 90, and in Fig. 10 a somewhat simplified wiring diagram is shown.

It will be recalled from the foregoing discussion that the groups of stationary contacts with which the wipers 80 and 81 cooperate are the equivalent of a single series of contacts with a single wiper. In like manner, the groups of contacts cooperating with the wipers 82 and 83 are the electrical equivalent of a single set of contacts having a single wiper. Therefore, in Fig. 10 a single wiper 80 is shown cooperating with a series of stationary contacts and a single wiper, 82 is shown cooperating with another series of contacts. In a similar manner, only the wipers 71 and 74 are shown, each cooperating with a series of stationary contacts. It is to be noted that the contacts associated with wipers 71 and 74 are shown as a complete circle, while the contacts associated with wipers 80 and 82 extend through approximately 270° of arc. Thus, although the wipers move through a complete arc of 360° it is not practical to use about a quarter of this arc because the condenser during such quarter of arc does not function with sufficient accuracy.

In the diagram Fig. 10 the several series of contacts are identified by the letters C, D, E and F, for the purpose of convenient reference.

In the diagram Fig. 10 a source of direct current in the form of a battery, is indicated at 100. To simplify the description, the operation of only six keys are shown and they are numbered consecutively from 102 to 107. A switch 101 is shown in the circuit from the battery and in Fig. 10 this switch is shown as open and key 102 is shown as depressed. With switch 101 open, no current flows through the relays A and B. With the wipers in the position shown none is in electrical connection with key 102 and therefore, upon the closing of switch 101, relays are not actuated and the armature 88 of relay A makes contact at 89 thereby closing a circuit through the battery 100. The circuit thus closed, may be traced as follows. From the positive side of the battery to junction 110, along wire 111 to armature 88 through contact 89, along wire 112 to contact 49, leaf spring 48 to electromagnet 44. From the magnet, current passes along wire 113 to junction 114 and through closed switch 101 back to the battery.

It has previously been mentioned that the electromagnet 44 and electromagnet 28 are connected in parallel so that they may operate separately or together. Therefore, under the condition assumed, current also passes from the positive side of the battery and along wire 111, which is also connected to armature 88A. Since 88A is in contact with 89A current passes through wire 115 to contact 40 associated with electromagnet 28. From contact 40 the current passes to leaf spring 38, thence through magnet 28 and along wire 116 to junction 114, thence to the negative side of the battery.

If there were no means provided to stop the flow of current to the electromagnets 28 and 44, they would continue to move their respective pawls back and forth which pawls in turn would continue to rotate the ratchets 20 and 22 step by step, and the tuning shaft would continue to rotate. Since the purpose of the controlling keys is to determine at what angular position the shaft 4, shall stop, each key is provided with suitable contacts controlling suitable circuits whereby each ratchet mechanism is stopped at the desired place.

Key 102 is provided with three contacts, 118, 119, and 120. For the purpose of understanding the diagram, some of the thirty-eight contacts in series C and D have been numbered. Likewise some of the fifty contacts in series E and F have also been numbered.

Assuming that it is desired that key 102 is to stop the rotation of ratchet 20 when position 6 on series C has been reached by the wiper 80. Then a conductor 121 is connected to contact 6 and leads to junction 122 on wire 123, common to key 102 and key 103. The purpose of this will more clearly hereinafter appear. When the wiper 80 reaches contact 6 a current is established which passes from the positive side of the battery along wire 124 through contact 118 to junction 122, thence along wire 121 to contact 6, through wiper 80 to hub 84, thence through contact arm 86 to wire 125, which leads to the lower coil of relay A. Current passes from the coil to junction 126, thence along wire 127 to junction 128, thence through contact 120 to wire 129, thence through switch 101 to the negative side of the battery. The instant that a current is established through the lower coil of relay A, the circuit to electromagnet 44 is broken by armature 88 being pulled away from contact 89 and immediately ratchet 20 ceases to rotate. It is to be understood, of course, that the relay is very sensitive and requires very little force to move it, compared to the power necessary to operate magnet 44 hence, the relay A breaks the circuit to magnet 44 before it has an opportunity to cause more than the proper degree of movement of the ratchet 20. Hence, the shaft 4 is positioned at a point corresponding to contact 6. This movement of the shaft constitutes a coarse adjustment afforded by the contacts in the upper series of contacts.

In order to effect fine adjustment, the key 102 also controls the stopping position of the shaft 4 as such shaft is being rotated by the ratchet 22. As illustrated in Fig. 10 a wire 130 is connected at contact 22 of series E. This wire passes to junction 131 and thence along wire 132 to junction 133 where it connects with wire 134 which, like wire 123 is also associated with key 103.

When wiper 74 arrives at contact 22 a circuit is closed which passes from the positive side of the battery along 124, to junction 135, thence through contact 119, wire 134 to junction 133, to wire 132, to contact 22. From contact 22 the current flows through wiper 74, to hub 79 and along wire 136 to the lower coil of relay B.

From this relay the current passes to junction 126 and returns to the negative side of the battery along wire 127 and wire 129.

It will be noted that the same wire 127 is utilized for the return circuit for the lower coils of both relays A and B.

If key 103 is depressed, key 102 is released. This is due to the well known construction of keyboard having a slotted sliding plate, spring pressed in one direction, each key having a shoulder to engage the plate to move it to release any previously depressed key or to be engaged by the plate to hold a key depressed.

Key 103 has contacts 118, 119 and 120, these being repeated for all of the keys. As key 102 is restored, the circuits established by such key are all broken and new ones established by key 103.

A conductor 138 is connected at contact 24 in series D and this conductor joins wire 121, leading to wire 123 which is common to the two keys 102 and 103.

A conductor 140 is connected at contact 19 in series F and this conductor joins wire 132 at junction 131. Wire 132 joins 134 and 133 which wire 134 connects any depressed key to the positive side of the battery through key contact 118, wire 141 and wire 124.

As key 102 breaks contact at 120, relays A and B are deenergized and contacts 88—89 and 88a—89a are restored. Consequently magnets 44 and 28 are both supplied with current and shaft 4 begins to rotate. Key 103 in closing contact 120 makes it possible for the relays A and B to function as soon as a wiper of either series of contacts comes opposite a contact from which a wire leads to a key.

Therefore, when wiper 82 reaches contact point 24 of series D, a circuit is established which passes from the positive side of the battery 100 along wire 124 to junction 142 and through contact 118 of key 103, which contact is now assumed to be closed. Current may now flow through wire 123 to junction 122, thence along wire 121 to junction 143, to wire 138 to contact point 24 of series D, thence through wiper 82 to ring 85, to 87, to 144 and to the upper coil of relay A. From this relay it passes to junction 146 at wire 147 through contact 120 of key 103 to wire 129 and back to the negative side of the battery. Energization of relay A breaks the circuit to magnet 44, and ratchet 20 stops rotating.

When wiper 71 reaches point 19 in series F a circuit is established which passes from the positive side of the battery along wire 124 to junction 142 through key contact 119 of key 103, which is now also assumed to be closed, and to junction 133; thence along wire 132 to junction 131, to wire 140 to contact point 19. From here it goes along wiper 71 to 78, thence along wire 148 to the upper coil of relay B. Leaving the relay the current passes to junction 146, to wire 147 and through contact 120 of key 103 to 129 and back to the negative side of the battery. The ratchet 22, is then stopped.

It has been thought necessary fully to trace the circuits from the two keys 102 and 103 which are connected in pairs with series C and D through the common conductor 121.

Likewise these same keys are also connected to series E and F by the common conductor 132.

While the two keys 102 and 103 using the same conductors 121 and 132 are shown as adjacent keys, this is not essential, as any two keys may use a single conductor provided that one key of a pair is connected to a contact point in series C or E and the other key of the pair is connected to a contact point in series D or F.

Conductors 127 and 147 leading from the relays A and B are common to all of the keys. Conductor 127 is connected to keys 102, 104 and 106 through junctions 128, 150 and 151. Conductor 147 is connected to keys 103, 105 and 107 through junctions 152, 153 and 154.

Therefore, in the embodiment of the invention shown in Fig. 10, the total number of conductors leading from the remote control unit, comprising the keyboard, to the receiving apparatus is $N+2$ where N is the number of the keys (provided N is an even number). Thus with six keys the total number of conductors would be eight, one for each key and the additional conductors 127 and 147 from the relays.

It is to be noted that both ratchets 20 and 22 may be rotating at the same time and one may stop while the other may continue to rotate. Each will stop when a wiper engages a contact with which a depressed key is associated.

It is also possible that one or the other ratchet may have to stop at the same position for different frequencies, since the frequency of the receiver depends on the combination of the movements of the two ratchet mechanisms. This is illustrated in Fig. 10 where key 104 is connected to contact point 31 of series E while key 105 is connected up in a manner similar to wire 132. Wire 157 leading to contact 30 of series C and to 31 of series D is connected to the keys 104 and 105 in a manner similar to the wire 121. Likewise wires 158 and 159 correspond to wires 132 and 121 respectively.

It is also possible to have three or more keys connected to the same contact point.

This is illustrated in Fig. 10 where key 106 is connected to contact point 31 in the series E through wire 156. For this purpose a wire 145 is connected to 134 and joins 156 at junction 149. In this case however, the corresponding wire 134 is not common to key 106 and 107 but key 107 is connected to a contact in series F through wire 158.

It is obvious that a similar arrangement of wiring could be applied to the series of contacts C or D.

To show more clearly the points of contact to which the several keys are wired numerals have been placed adjacent each key which numerals correspond to the points of contacts on the several series of contacts. For instance key 102 is wired to contact point 6 in series C and to contact 22 in series E. Key 103 to contacts 24 and 19.

With the construction and operations above described the tuning shaft of the radio set may be set under control of any of the keys to the desired frequency and except in very exceptional cases, the setting is sufficiently accurate.

For exceptional receivers in which particularly accurate tuning is necessary I have included electronic circuits which make it possible to tune the receiver exactly to the desired frequency.

I have also provided a switching device whereby the keys may control more than one set of frequencies, according to the position of the switching device.

The construction and operation of the electronic means and switching device are illustrated in Fig. 11.

*Operation of the switching device and electronic means*

Fig. 11 differs from Fig. 10 in illustrating the several series of electric contact devices more nearly in accord with the manner in which these are shown in the mechanical views. This figure in addition illustrates the switching device already briefly referred to and the electronic means by which very precise tuning may be effected.

The operation of the keys in controlling the circuits to select the proper stopping place of the tuning shaft 4 is substantially the same as that described in connection with Fig. 10 and in so far as possible, the wiring is given the same numbers as in Fig. 10 where wires connect to the same keys.

In Fig. 11 each series of electrical contacts are shown as divided into two groups. The two groups of each series are designated by the letters C, D, E and F, as in Fig. 10. Some of the contacts of the left hand group of Series C are numbered as well as some of the contacts of the right hand group. The two groups of series C correspond to the single series C of Fig. 10 wherein the two groups are combined. In series E and F each group contains twenty-five contact points.

Only four keys are shown in Fig. 11 these corresponding to 102, 103, 104 and 105 of Fig. 10. Key 102 is connected to contact 6 in series C and to contact 22 in series E. Key 103 is connected at contact 24 in series D and to contact 19 in series F. Keys 104 and 105 are connected to contacts corresponding to those shown in Fig. 10.

Due to the provision of a switching device whereby a group of keys may be connected to more than one set of contacts, the wiring in Fig. 11 differs somewhat from Fig. 10 as will now be pointed out. It will be noted that in Fig. 10 the wire 121, from contact 6 passes directly to keys 102 and 103. In Fig. 11 however, wire 121 leading from contact 6 passes to a junction 160 on the switching device 162.

Wire 138 from contact 24 in series D instead of joining directly with wire 121 as shown in Fig. 10 is also connected to the switching device at junction 163. The two junction points are joined at 164 from which wire 121 continues to the keys 102 and 103. Likewise, wire 132 connects at 165 with a wire in the switching device, said wire dividing and passing to junctions 166 and 167. Wire 130 connected at contact point 22 in series E is connected to junction 166 while wire 140 connected at contact point 19, series F, is connected to junction 167 of the switching device 162.

In a similar manner, wire 157 serves to connect wires leading from the contacts 31 and 30 in series C and D respectively. Wire 156 serves as a common connection between keys 104 and 105 and the wires leading to contacts 31 and 31 in series E and F respectively.

The switching device 162 is also provided with junction points 170, 171, 172, 173, 174, 175, 176 and 177 with which contacts may be made to wires 121, 132, 157 and 156 by moving the switching device from the position shown in Fig. 11 a distance sufficient to cause these wires to be switched to the other series of junction points 170 to 177.

In order to avoid confusion in the diagram the wires leading from the junction points 170 and 177 are not shown as connected to contact points of the several series of stationary contacts. It will be obvious, however, that a wire leading from the junction, 170 may be connected to any contact point in series C and that the wire leading from junction 171 may be connected to any contact point in series D. Likewise, in a similar manner, the wires leading from the junctions 172 and 173 may be connected to a contact point in either series E or series F.

It will thus be apparent that the capacity of a set of keys to select different frequencies is doubled by the switching device shown in Fig. 11.

It is, of course, obvious that this switching device might be provided with another series of junction points to thereby further increase the capacity of the keyboard. This switching device is useful where it is desired to limit the number of keys and conductors or where the number of radio frequencies to be received is greater than the normal key capacity. For example, suppose a pilot is to fly from New York to San Francisco and during the trip from New York to Chicago, it is desired to tune the radio receiver to 30 different frequencies. Under such conditions, only 30 keys are necessary. However, suppose that from Chicago to San Francisco 30 frequencies unrelated to the first set of frequencies is desired. The wires leading from the junction points 170 to 177 would be connected to the appropriate contact point for the second series of frequencies desired and when the plane arrived at Chicago, the switch 162 would be thrown from the position shown in Fig. 11 to the position in which the second series of junction points became effective. It is to be noted, that there has been no change in the wires 127 and 147 in Fig. 11 from the construction shown in Fig. 10. These wires lead from the relays A and B to break the circuits to the magnets 44 and 28 respectively.

As previously stated, the ratchet mechanisms giving a coarse and a fine adjustment to the tuning shaft, are sufficient for normal frequency ranges.

To provide for exceptional receivers, the electronic means already referred to is provided and this means is illustrated diagrammatically in Fig. 11.

In Fig. 11, 179 is an oscillator tube, which employs a conventional circuit. The variable condenser comprising stationary plates 8 and movable plates 9 is connected across tank coil 190 to provide for varying the frequency. The plate of tube 180 is connected through condenser 188 to the grid side of coil 190, while the cathode of tube 180 is connected through condenser 187 to the ground side of coil 190.

Tube 180 is connected to function as a "reactance tube," or "frequency control tube"; i. e., it acts as a reactance whose magnitude can be varied by varying the amplification of the tube. Condenser 181 couples the plate of tube 180 to the control grid 184, and the reactance of condenser 181 is much greater than the resistance of resistor 182. Under this condition, the grid-to-cathode voltage is approximately 90° out of phase with the plate-to-cathode voltage, thus causing the plate current to be approximately 90° out of phase with the plate-to-cathode voltage. The tube therefore acts as a reactance, so far as alternating voltages applied between plate and cathode are concerned, and the magnitude of this reactance can be varied by varying the grid bias voltage, as this changes the degree to which the alternating grid voltage is able to control the plate current.

The cathode current of tube 180 flows through fixed resistor 183, variable resistor 185, switch 186, and any one of fixed resistors 187 to ground.

Variable resistor 185 is intended normally to be left at a setting corresponding to half of its maximum resistance. The resistance of each resistor 187 is chosen to give the cathode bias voltage necessary to adjust the reactance of tube 180 so that oscillator 179 will have exactly the correct frequency, after variable condenser 157 has been set as close as possible to the correct setting by means of the ratchet mechanisms. All of the push buttons are equipped with resistors 187 to obtain the correct frequencies corresponding to these push buttons. Ordinarily, the correct frequency adjustment probably could be obtained with sufficient accuracy if five or six sizes of fixed resistors were available for use with the push buttons.

Variable resistor 185 in practice would be equipped with a knob, accessible to the operator, so that the operator can, if necessary, adjust it to compensate for variations in frequency calibration caused by variations in temperature or tube characteristics, or wear and tear on the tuning mechanism. Under ordinary conditions however, resistor 185 can remain set at half maximum resistance.

When switching device 162 is moved from one position to another, switch 186 is also moved from contact 188 to contact 189 to enable the push buttons to control a new set of fixed resistors 191 for controlling reactance tube 180.

Each of the keys or push buttons 102 to 105, Fig. 11, are provided with a set of contacts 192 and 193 whereby the set of resistors 187 or 191 are rendered active, depending upon the position of the switch 186.

The electronic means is illustrated in connection with the ratchet mechanisms. It is obvious however, that where the range of frequencies to be covered by the receiver is not too wide, the electronic means may be used with a single ratchet mechanism and where the frequency range to be covered is quite narrow the electronic means, under control of the keys, may be used alone.

From the foregoing it is apparent that I have devised a system of remote control which is very flexible and therefore adaptable to a variety of conditions. It is obvious also that changes may be resorted to within the scope of the invention without departing from the spirit thereof, and that some of the features may be used without others.

What I claim is:

1. In a tuning mechanism for a radio receiving set having a tuning shaft, two independent means each independently operatively associated with said shaft for rotating it step by step at different rates, and means for combining the step-by-step movements produced by simultaneous action of said two independent means to produce the algebraic sums of the two movements.

2. In a tuning mechanism for a radio receiving set having a tuning shaft, two independent means each operatively associated with said shaft for rotating it at different ratios, a plurality of keys and means associated with each key and with said shaft rotating means for controlling the stopping positions of said shaft under action of said rotating means.

3. In a tuning mechanism for a radio receiving set, the combination with a tuning shaft, of a coarse adjustment operating means for moving said shaft step by step, a fine adjustment operating means for also moving said shaft step by step the complete arc of movement of each of said operating means being the same, and means connecting said operating means to the shaft to rotate it at different ratios.

4. In a tuning mechanism for a radio receiving set, the combination with a tuning shaft, of a coarse adjustment operating means for moving said shaft step by step, a fine adjustment operating means for also moving said shaft step by step the complete arc of movement of each of said operating means being the same, and means connecting said fine adjustment operating means to said shaft in the ratio of one complete arc of movement thereof to one step of movement of said coarse adjustment means.

5. In a system for tuning a radio receiving set, the combination with a tuning shaft, of an electrically driven coarse adjustment means for moving said shaft step by step an electrically driven fine adjustment means for also moving said shaft step by step, the complete arc of movement of each of said operating means being the same, means for integrating such step-by-step movements during simultaneous operations of the two adjustment means, and electrical station selecting means for positioning the tuning shaft in station selecting positions including two series of stationary electrical contacts for each of said operating means, a plurality of wipers operated step by step with each of said operating means and each engaging a stationary contact on the corresponding series of contacts at each step of movement, a plurality of circuit closing keys for station selection, a single conductor electrically associated with two of said keys to form a part of two circuits closed thereby and with a contact on each of said series of contacts associated with said coarse adjustment operating means, another single conductor electrically associated with the same two keys and with a contact on each of said series of contacts associated with said fine adjustment operating means, and means operated by depression of one of said keys to stop the coarse adjustment means and the fine adjustment means when corresponding wipers engage selected contacts.

6. In a tuning mechanism for a radio receiving set, the combination with a tuning shaft, of electro-magnetic means for rotating said shaft step by step to select different stations, and means for stopping said shaft at selected positions including two series of stationary electrical contacts, means for integrating the step-by-step rotational movements, a plurality of wipers one for each series of contacts and each engaging a contact at each step of movement of said shaft, a series of keys, a single conductor electrically associated with two of said keys and with a contact in each of said series of stationary contacts, a relay electrically associated with said wipers and with said two keys, said relay acting through said single conductor to break the current to said electro-magnetic means.

7. In a tuning mechanism for a radio receiving set the combination with a tuning shaft, an auxiliary shaft aligned therewith, two independent means each operatively associated with said tuning shaft and with said auxiliary shaft for rotating said tuning shaft step by step at different rates, and means for causing movements of said auxiliary shaft to be transmitted to said tuning shaft and to cause corresponding additional movement of said tuning shaft to effect complete tuning movements according to the algebraic sums of the two movements.

8. In a tuning mechanism for a radio receiving set the combination with a tuning shaft, an auxiliary shaft aligned therewith, two independent means each operatively associated with said tuning shaft and with said auxiliary shaft for rotating said tuning shaft step by step at different rates, and means for coupling said shafts whereby said auxiliary shaft may change correspondingly the movement of the tuning shaft in one direction of rotation to an extent corresponding to the algebraic sums of the two movements.

9. In a system of radio tuning including a remote control unit and a receiving unit, said remote control unit including a series of control keys and said receiving unit including a tuning shaft, two ratchet mechanisms each independently connected to said shaft for independently rotating it at different ratios and connections from each of said keys for controlling the stopping of said ratchet mechanisms independently.

10. The combination with a shaft, of electromagnetic ratchet mechanisms for rotating said shaft step by step, a source of current for said electromagnetic ratchet mechanisms, a series of stationary electric contacts, a wiper for said series of contacts engaging a contact on each step of movement on said shaft, a key, and means controlled by said key for breaking the circuit to said electro-magnetic ratchet mechanisms when said wiper reaches a predetermined contact.

11. The combination with a shaft, of two electro-magnetic ratchet mechanisms for rotating said shaft step by step in different ratios, a source of current for said electro-magnetic ratchet mechanisms, a series of stationary electric contacts, a wiper for said series of contacts engaging a contact on each step of movement of said shaft, a key, and means controlled by said key for breaking the circuit to said electro-magnetic ratchet mechanisms when said wiper reaches a predetermined contact.

12. The combination with a shaft, of means for rotating said shaft step by step to select different positions thereof including electro-magnetic ratchet mechanisms, two series of stationary electric contacts, a plurality of wipers, one for each series of contacts, and each engaging a contact on each step of movement of said shaft, a key, and means controlled by said key for breaking the circuit of each of said electro-magnetic ratchet mechanisms successively or simultaneously when one or the other of said wipers reaches a predetermined contact.

13. The combination with a shaft, of means for rotating said shaft step by step to select different positions thereof including electro-magnetic ratchet mechanisms, two series of stationary electric contacts, a wiper for each series of contacts, and each engaging a contact on each step of movement of said shaft, a relay for breaking the circuit to each of said electro-magnetic ratchet mechanisms, a key, and means controlled thereby for establishing a circuit to said relay when a wiper reaches a predetermined contact.

14. In a device of the character described, a shaft, means for rotating said shaft step by step including a rotatable ratchet, electro-magnetic means for rotating said ratchet, a circuit for said means, a depressible key and a relay for controlling said circuit, said circuit being normally closed at said relay and open on said key, said key upon depression closing the circuit to said ratchet rotating means, and means controlled jointly by said ratchet rotating means and said key to cause said relay to break the circuit to said ratchet rotating means.

15. In a device of the character described, a shaft, means for rotating said shaft step by step including two independently rotatable ratchets, electro-magnetic means for rotating said ratchets independently, connections therefrom to said shaft, parallel circuits for said ratchet rotating means, a depressible key and relays for controlling said circuit, said circuits being normally closed at said relays and open at said key, said key upon depression closing the circuits to both said ratchet rotating means and means controlled jointly by said ratchet mechanisms and said key to cause said relays to break the circuits to said ratchet rotating means.

16. In a system of radio tuning including a remote control unit and a receiving unit, said remote control unit including a series of keys and said receiving unit including a tuning shaft and electro-magnetic ratchet means for rotating said shaft, two series of stationary electrical contacts, a single conductor electrically associated with two of said keys and with a contact on each of said series of stationary contacts and means controlled by said keys through said single conductor for breaking the current through said electro-magnetic means to stop movement of said shaft at a definite position.

17. In a tuning mechanism for a radio receiving set, the combination with a tuning shaft, of electro-magnetic means for rotating said shaft step by step to select different stations, two series of stationary electrical contacts, a plurality of wipers one for each series of contacts and each engaging a contact on each step of movement of said shaft, a series of keys, a single conductor electrically associated with two of said keys and with a contact in each of said series of stationary contacts and means controlled by said keys through said single conductor to cause current to pass through said wipers, a conductor from each of said wipers also associated with said two keys and means for breaking the current through said electro-magnetic means to stop movement of said shaft at a definite position upon the current passing through said wipers and said last-mentioned conductor.

18. In a tuning mechanism for a radio receiving set, the combination with a tuning shaft, of a set of stationary electrical contacts, means for rotating said shaft step by step, means for causing the stoppage of said rotating means at a predetermined point, a series of keys, a plurality of conductors each conductor electrically associated with a pair of keys of the series and with two of said contacts, a switching device which in one position connects each pair of keys associated with a conductor or to two contacts of said set of stationary contacts and in another position connects each of said pair of keys associated with said conductor or to two other contacts of said set.

19. In a system for tuning a radio receiving set, the combination with a tuning shaft, of an electrically-operated coarse adjustment means for independently moving said shaft step-by-step, an electrically operated fine adjustment means for independently moving said tuning shaft step-by-step, means for integrating such movements during simultaneous operation of the two adjustment means, an actuating circuit for each of said adjustment means provided with a circuit breaking relay device, and an electrical system for operating said relay devices including two series of stationary contacts for each of said adjusting means, wipers one for each series of stationary contacts moved over successive contacts step-by-step with the corresponding adjustment means, a plurality of station selecting keys, means operated by depression of any station selecting key to effect through the corresponding relay devices a connection from a selected contact of one of the coarse adjustment series to the corresponding wiper and a similar connection from a selected contact of one of the fine adjustment series to the corresponding wiper, whereby engagement of a selected contact by the corresponding wiper will operate the corresponding relay device and stop the corresponding adjustment means.

20. In a system for tuning a radio receiving set, the combination with a tuning shaft, of an electrically-operated coarse adjustment means for independently moving said shaft step-by-step, an electrically operated fine adjustment means for independently moving said tuning shaft step-by-step, means for integrating such movements during simultaneous operation of the two adjustment means, an actuating circuit for each of said adjustment means provided with a circuit breaking relay device, and an electrical system for operating said relay devices including a series of stationary contacts for each of said adjusting means, wiping means for each series of stationary contacts moved over successive contacts step-by-step with the corresponding adjustment means, a plurality of station-selecting keys, means operated by depression of any station selecting key to effect through the corresponding relay devices a connection from a selected contact of the coarse adjustment series to the corresponding wiper means and a similar connection from a selected contact of the fine adjustment series to the corresponding wiper, whereby engagement of a selected contact by the corresponding wiper will operate the corresponding relay device and stop the corresponding adjustment means.

FREDERICK W. FRINK.